(12) United States Patent
Chang et al.

(10) Patent No.: US 11,631,888 B2
(45) Date of Patent: Apr. 18, 2023

(54) AMORPHOUS NITROGEN-RICH SOLID STATE LITHIUM ELECTROLYTE

(71) Applicants: Samsung Electronics Co., Ltd., Suwon-si (KR); Massachusetts Institute of Technology, Cambridge, MA (US)

(72) Inventors: Won Seok Chang, Mountain View, CA (US); Zachary Hood, Cambridge, MA (US); Jennifer Rupp, Cambridge, MA (US); Lincoln Miara, Lincoln, MA (US)

(73) Assignees: SAMSUNG ELECTRONICS CO., LTD., Suwon-si (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 111 days.

(21) Appl. No.: 17/115,152

(22) Filed: Dec. 8, 2020

(65) Prior Publication Data

US 2022/0013806 A1 Jan. 13, 2022

Related U.S. Application Data

(60) Provisional application No. 63/051,024, filed on Jul. 13, 2020.

(51) Int. Cl.
*H01M 10/0562* (2010.01)
*H01M 10/0525* (2010.01)
(Continued)

(52) U.S. Cl.
CPC ..... *H01M 10/0562* (2013.01); *C01B 21/0821* (2013.01); *H01M 4/382* (2013.01);
(Continued)

(58) Field of Classification Search
None
See application file for complete search history.

(56) References Cited

U.S. PATENT DOCUMENTS

2015/0044575 A1* 2/2015 Kawaji ............... H01M 10/052
252/62.2
2015/0180001 A1 6/2015 Johnson et al.
(Continued)

OTHER PUBLICATIONS

Shen, Xin et al., "Beyond lithium ion batteries: Higher energy density battery systems based on lithium metal anodes", Energy Storage Materials 12 (2018); pp. 161-175.

*Primary Examiner* — Daniel S Gatewood
(74) *Attorney, Agent, or Firm* — Cantor Colburn LLP

(57) ABSTRACT

A lithium ion conductor includes a compound of Formula 1:

$$Li_{7-a^*\alpha-(b-4)^*\beta-x}M^a_\alpha La_3 Zr_{2-\beta}M^b_\beta O_{12-x-\delta}X_x N_\delta \quad \text{Formula 1}$$

wherein in Formula 1,
$M^a$ is a cationic element having a valence of a,
$M^b$ is a cationic element having a valence of b, and
X is an anion having a valence of −1,
wherein, when $M^a$ comprises H, $0 \leq \alpha \leq 5$, otherwise $0 \leq \alpha \leq 0.75$, and
wherein $0 \leq \beta \leq 1.5$, $0 \leq x \leq 1.5$, $(a^*\alpha+(b-4)\beta+x) > 0$, and $0 < \delta \leq 6$.

25 Claims, 11 Drawing Sheets

(51) Int. Cl.
*H01M 4/38* (2006.01)
*H01M 4/40* (2006.01)
*C01B 21/082* (2006.01)
*H01M 4/02* (2006.01)

(52) U.S. Cl.
CPC ....... *H01M 4/405* (2013.01); *H01M 10/0525* (2013.01); *C01P 2002/02* (2013.01); *C01P 2002/72* (2013.01); *C01P 2004/03* (2013.01); *C01P 2006/16* (2013.01); *C01P 2006/40* (2013.01); *H01M 2004/027* (2013.01); *H01M 2300/0077* (2013.01); *H01M 2300/0094* (2013.01)

(56) References Cited

U.S. PATENT DOCUMENTS

| | | |
|---|---|---|
| 2016/0308243 A1 | 10/2016 | Herle et al. |
| 2017/0155169 A1* | 6/2017 | Hitz .................... H01M 10/052 |
| 2018/0301752 A1 | 10/2018 | Sakamoto et al. |
| 2019/0027788 A1 | 1/2019 | Liu et al. |
| 2019/0044186 A1 | 2/2019 | Kim et al. |
| 2019/0051934 A1 | 2/2019 | Kim et al. |
| 2019/0051936 A1 | 2/2019 | Meshcheryakov et al. |
| 2019/0123384 A1 | 4/2019 | Harry et al. |
| 2020/0044281 A1 | 2/2020 | Zhu et al. |
| 2020/0044282 A1 | 2/2020 | Zhu et al. |
| 2020/0067128 A1 | 2/2020 | Chmiola et al. |
| 2021/0305621 A1 | 9/2021 | Chang et al. |

* cited by examiner

AMORPHOUS NITROGEN-RICH SOLID STATE LITHIUM ELECTROLYTE

CROSS-REFERENCE TO RELATED APPLICATION

This application claims priority to U.S. Provisional Patent Application No. 63/051,024, filed on Jul. 13, 2020, in the United States Patent and Trademark Office, and all the benefits accruing therefrom under 35 U.S.C. § 119, the content of which is incorporated herein in its entirety by reference.

BACKGROUND

1. Field

Disclosed is an amorphous nitrogen-rich lithium-ion conductor, a method of preparing the same, a component for a lithium battery including the amorphous nitrogen-rich lithium-ion conductor, a method of preparing the same, a lithium battery including the amorphous nitrogen-rich lithium-ion conductor, and a protected positive active material including the amorphous nitrogen-rich lithium-ion conductor.

2. Description of the Related Art

There has been increased focus on using lithium metal negative electrodes in order to improve the energy density of batteries. However, a suitable material has yet to be found that can prevent lithium dendrites from propagating to the positive electrode and short-circuiting the cell. Thus there remains a need for improved solid state lithium battery material.

SUMMARY

Disclosed is an amorphous nitrogen-rich lithium-ion conductor having improved stability and improved ionic conductivity, a method of manufacturing the same, a component for a lithium battery including the amorphous nitrogen-rich lithium-ion conductor, a method of preparing the same, a lithium battery including the amorphous nitrogen-rich lithium-ion conductor, and a protected positive active particle material including the amorphous nitrogen-rich lithium-ion conductor.

In an embodiment, a lithium ion conductor includes a compound of Formula 1:

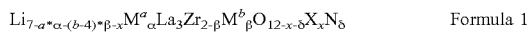  Formula 1 wherein in Formula 1,
$M^a$ is a cationic element having a valence of a,
$M^b$ is a cationic element having a valence of b, and
X is an anion having a valence of −1,
wherein, when $M^a$ includes H, $0 \leq \alpha \leq 5$, otherwise $0 \leq \alpha \leq 0.75$, and
wherein $0 \leq \beta \leq 1.5$, $0 \leq x \leq 1.5$, $(a^*\alpha + (b-4)\beta + x) > 0$, and $0 < \delta \leq 6$.

In an embodiment, a method of preparing a lithium ion conductor includes: providing a substrate; heating the substrate; providing a mixture comprising a nitrogen precursor, a lithium precursor, a lanthanum precursor, an aluminum precursor, a zirconium precursor, and a solvent; and contacting the heated substrate with the mixture to prepare the lithium ion conductor, wherein the lithium ion conductor includes a compound represented by a Formula 1,

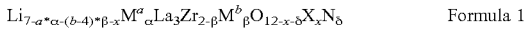  Formula 1 wherein in Formula 1,
$M^a$ is a cationic element having a valence of a,
$M^b$ is a cationic element having a valence of b, and
X is an anion having a valence of −1,
wherein, when $M^a$ includes H, $0 \leq \alpha \leq 5$, otherwise $0 \leq \alpha \leq 0.75$, and
wherein $0 \leq \beta \leq 1.5$, $0 \leq x \leq 1.5$, $(a^*\alpha + (b-4)\beta + x) > 0$, and $0 < \delta \leq 6$.

In an embodiment, a component for a lithium battery includes: a first layer including the lithium ion conductor and having a porosity of 0 percent to less than 25 percent, based on a total volume of the first layer; a second layer including a porous material having a porosity of 25 percent to 80 percent, based on a total volume of the second layer, wherein the second layer is on the first layer and the second layer has a composition that is different from a composition of the first layer.

In an embodiment, a method of manufacturing a component for a lithium battery includes: providing a substrate having a porosity of 25 percent to 80 percent, based on a total volume of the substrate; heating the substrate; contacting the heated substrate with a mixture including a nitrogen precursor, a lithium precursor, a lanthanum precursor, an aluminum precursor, a zirconium precursor, and a solvent to prepare a lithium ion conductor on the substrate and manufacture the component, wherein the lithium ion conductor comprises a compound represented by a Formula 1,

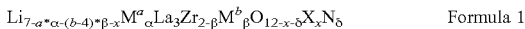  Formula 1 wherein in Formula 1,
$M^a$ is a cationic element having a valence of a,
$M^a$ is a cationic element having a valence of b, and
X is an anion having a valence of −1,
wherein, when $M^a$ comprises H, $0 \leq \alpha \leq 5$, otherwise $0 \leq \alpha \leq 0.75$, and
wherein $0 \leq \beta \leq 1.5$, $0 \leq x \leq 1.5$, $(a^*\alpha + (b-4)\beta + x) > 0$, and $0 < \delta \leq 6$.

wherein the first layer includes the lithium ion conductor and has a porosity of 0 percent to less than 25 percent, based on a total volume of the first layer, and wherein the second layer includes the substrate.

In an embodiment, a lithium battery includes: a positive electrode; a negative electrode including at least one of lithium or a lithium alloy; and the component including the lithium ion conductor between the positive electrode and the negative electrode.

In an embodiment, a protected positive active material includes: a positive active material; and a coating layer on the surface of the positive active material, wherein the coating layer includes the lithium ion conductor.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
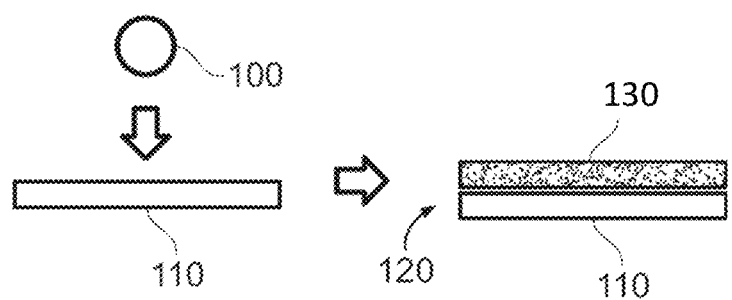
FIG. 1 is a schematic diagram of an embodiment of a method of manufacturing a lithium ion conductor.

Solid-state batteries are desired because they can potentially offer improved specific energy and energy density, while providing improved safety. Solid-state materials may permit the use of a high-voltage lithium metal oxide, such as lithium nickel-manganese-cobalt oxide (NMC). However, interposing a solid-state electrolyte between a lithium and a high-voltage oxide such as NMC poses a number of engineering challenges. While not wanting to be bound by theory, it is understood that elemental inter-diffusion between the positive active material, e.g., NMC, and the solid-state electrolyte, and volume changes during charge and discharge result in degradation of the mechanical integrity of the solid electrolyte-positive electrode interface. To mitigate the issues from volume changes, an ionic liquid may be added between the solid-state electrolyte and the positive electrode to provide a hybrid lithium battery. However, currently available components do not suitably prevent elemental inter-diffusion between the positive electrode and the solid-state electrolyte, which is understood to result in mechanical degradation of the solid electrolyte-positive electrode interface.

One material, $Li_7La_3Zr_2O_2$ (LLZO), has been found to have desirable properties, however, because it is difficult to manufacture into a thin and free-standing membrane, it is not sturdy enough or practical for commercial use. LLZO is also expensive to prepare and high temperature annealing to prepare a film that can effectively prevent dendrite formation results in high production costs. Annealing at a high temperature also causes the film to react with the underlying substrate, which adversely impacts the performance of the lithium ion conductor. Additionally, LLZO materials have limited stoichiometry, which often results in the formation of undesirable impurity phases.

Components that include garnet-type oxides such as LLZO can provide promising lithium-ion conductivity. It would thus be desirable to use a garnet-type oxide electrolyte in a solid-state battery and a hybrid lithium-ion battery. However, as noted above, such materials pose a number of engineering challenges.

To mitigate these issues, the disclosed technology provides a lithium ion conductor that can be cost-effectively manufactured on a commercial scale and prevents deterioration of the solid electrolyte-positive electrode interface when used in an electrochemical cell. Without wishing to be bound by theory, the disclosed lithium ion conductor is believed to protect the lithium metal negative electrode from side reactions with the ionic liquid, and the ionic liquid allows for volume changes at the positive electrode, thus preventing deterioration of the solid electrolyte-positive electrode interface. Furthermore, the disclosed lithium ion conductor is significantly less expensive to produce than a conductor comprising pure LLZO.

In addition to providing a commercially viable lithium ion conductor, the disclosed technology can provide an inexpensive approach for forming a stable electrolyte.

The lithium ion conductor may be amorphous, comprise a highly nitrogen doped LLZO compound, and may be deposited at a relatively low temperature, which allows the compound to be applied to a variety of substrates. The nitrogen doped LLZO compound may be deposited on a substrate to form a separator to provide an electrolyte component. The electrolyte component may be provided on a negative electrode layer to function as an interlayer, or on a positive active material to function as a protective layer. When the compound is deposited on a negative electrode layer to function as an interlayer, performance improves compared to negative electrode layers without the nitrogen-doped LLZO layer. Furthermore, the nitrogen doped LLZO outperforms uncoated separators and separators that have Li—N materials without the LLZO backbone.

Precursor compounds may be used to form the nitrogen-doped LLZO layer. It has been found that some precursor compounds facilitate film formation. The precursor compound may be, for example, a lithium azide or a lithium nitrate.

The nitrogen-doped LLZO compound may be deposited as a thin film on a suitable substrate. Additionally, the nitrogen-doped LLZO compound can be added as a layer onto a LLZO substrate to improve stability in the presence of lithium. During the preparation of the disclosed nitrogen-doped LLZO compound, temperatures above 500° C. are avoided. While not wanting to be bound by theory, it is understood that avoiding temperatures over 500° C. avoids undesirable reactions with desirable substrate materials such as yttria-stabilized zirconia (YSZ), $Li_{1.3}Al_{0.3}Ti_{1.7}(PO_4)_3$ (LATP), or borosilicate glass.

The disclosed lithium ion conductor comprises a compound of Formula 1:

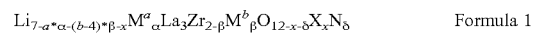

$$Li_{7-a^*\alpha-(b-4)^*\beta-x}M^a{}_\alpha La_3 Zr_{2-\beta}M^b{}_\beta O_{12-x-\delta}X_x N_\delta \qquad \text{Formula 1}$$

wherein in Formula 1, $M^a$ is a cationic element having a valence of a, $M^b$ is a cationic element having a valence of b, and X is an anion having a valence of −1, wherein, when $M^a$ comprises H, $0 \le \alpha \le 5$, otherwise $0 \le \alpha \le 0.75$, and wherein $0 \le \beta \le 1.5$, $0 \le x \le 1.5$, $(a^*\alpha+(b-4)\beta+x)>0$, and $0<\delta\le 6$.

A content α of $M^a$ in Formula 1 may be $0 \le \alpha < 5$, $0 < \alpha < 5$, $0.1 \le \alpha \le 4$, or $0.2 \le \alpha \le 3$ when $M^a$ comprises H. Otherwise, e.g., when $M^a$ is other than H, e.g., a divalent element, a trivalent element, or a tetravalent element, a content α of $M^a$ in Formula 1 may be 0≤α≤0.75, 0<α<0.75, 0.1≤α≤0.7, 0.2≤α≤0.6, or 0.3≤α≤0.5.

A content β of $M^b$ in Formula 1 may be 0≤β≤1.5, 0.1≤β≤1.4, 0.2≤β≤1.3, 0.3≤β≤1.2.

The compound of Formula 1 may comprise an oxygen defect. An oxygen defect content δ in Formula 1 may be 0≤δ≤1, 0<δ<1, 0.1≤δ≤0.9, or 0.2≤δ≤0.8. While not wanting to be bound by theory, it is understood that including an oxygen defect in the compound of Formula 1 provides improved ionic conductivity. In the compound of Formula 1, (a*α+(b−4)β+x)>0. For example, 0<(a*α+(b−4)β+x)<1, 0.1<(a*α+(b−4)β+x)<0.8, or 0.2<(a*α+(b−4)β+x)<0.6.

A content x of the anion X in the compound of Formula 1 may be 0≤x≤1.5, 0<x<1.5, 0.1≤x≤1.4, or 0.2≤x≤1.3. Use of $Li_{7-a*\alpha-(b-*4)*\beta-x}M^a{}_\alpha La_3 Zr_{2-\beta}M^b{}_\beta O_{12-x-\delta}X_x N_\delta$, wherein $M^a$ is $Al^{3+}$, α is 0.25, b, x, and β are 0, and δ is 2, e.g., $Li_{6.25}Al_{0.25}La_3Zr_2O_{10}N_2$ is mentioned.

In an embodiment, the compound represented by Formula 1 may be amorphous. The compound represented by Formula 1 may be partially amorphous and partially crystalline. The compound of Formula 1 being 50% to 95% amorphous is mentioned.

The lithium ion conductor may comprise greater than 0 to 20 mol % nitrogen, based on a total content of the lithium ion conductor. The lithium ion conductor may comprise nitrogen in a concentration, for example, of 0.001 mol % and 20 mol %, 0.01 mol % and 19 mol %, 0.05 mol % and 18 mol %, 0.1 mol % and 17 mol %, or 0.5 mol % and 16 mol %.

In an embodiment, a Li crystallographic site in the lithium ion conductor comprises $M^a$ disposed thereon. While not wanting to be bound by theory, it is understood that in the structure of the compound of Formula 1, $M^a$ resides on a lithium crystallographic site. It is observed that when the compound adopts a structure in which $M^a$ resides on a lithium crystallographic site, the lithium-ion conductivity and stability are improved.

In an embodiment, $M^a$ is at least one of a monovalent element, a divalent element, a trivalent element, or a tetravalent element. $M^a$ may be, for example, monovalent and is at least one of H, Na, K, or Rb. $M^a$ may be, for example, divalent and is at least one of Be, Mg, Ca, Sr, or Ba.

In an embodiment, a is 1 and $M^a$ is monovalent and is at least one of H, Na, K, or Rb. In an embodiment, a is 2 and $M^a$ is divalent and is at least one of Be, Mg, Ca, Sr, or Ba. In an embodiment, when a is 3 in Formula 1, $M^a$ may be trivalent and is at least one of B, Al, Ga, In, Sc, Y, La, Ce, Pr, or Nd. In an embodiment, when a is 4 in Formula 1, $M^a$ is tetravalent and is at least one of Hf, Ti, Sn, Si, Ge, or Pb.

In an embodiment, a Zr crystallographic site comprises $M^b$ disposed thereon. While not wishing to be bound by theory, it is understood that in the structure of the compound of Formula 1, $M^b$ is on a hafnium crystallographic site. It is observed that when the compound adopts a structure in which $M^b$ resides on a hafnium crystallographic site, the lithium-ion conductivity and stability are improved.

In an embodiment, $M^b$ is a divalent element, a trivalent element, a tetravalent element, or a pentavalent element.

In an embodiment, when b is 2 in Formula 1, $M^b$ is divalent and is at least one of Be, Mg, Ca, Sr, or Ba. In an embodiment, when b is 3 in Formula 1, $M^b$ is trivalent and is at least one of B, Al, Ga, In, Sc, Y, La, Ce, Pr, or Nd. In an embodiment, when b is 4 in Formula 1, $M^b$ is tetravalent and is at least one of Hf, Ti, Sn, Si, Ge, or Pb. In an embodiment, when b is 5 in Formula 1, $M^b$ is pentavalent and is at least one of V, Ta, or Nb. In an embodiment, when b is 6 in Formula 1, $M^b$ is hexavalent and is at least one of Cr, Mo, or W.

In an embodiment, $M^a$ and $M^b$ are different in the compound of Formula 1.

In an embodiment, in the compound of Formula 1, X is at least one of F, Cl, Br, or I. Use of fluorine, having a valence of −1, is mentioned.

The lithium ion conductor comprising a compound of Formula 1 may have an ionic conductivity of $1\times10^{-6}$ siemens per centimeter (S/cm) to $1\times10^{-4}$ S/cm, at 25° C. For example, the lithium ion conductor may have ionic conductivity from $1\times10^{-6}$ S/cm to about $1\times10^{-4}$ S/cm, about $2\times10^{-6}$ S/cm to about $1\times10^{-4}$ S/cm, about $2\times10^{-6}$ S/cm to about $5\times10^{-5}$ S/cm, about $4\times10^{-6}$ S/cm to about $5\times10^{-5}$ S/cm, about $4\times10^{-6}$ S/cm to about $1\times10^{-5}$ S/cm, or about $5\times10^{-6}$ S/cm to about $1\times10^{-5}$ S/cm. The ionic conductivity of the lithium ion conductor is comparable with the ionic conductivity of a crystalline film.

In an embodiment, a component for a lithium battery comprises a first layer comprising the lithium ion conductor of Formula 1 and having a porosity of 0 percent (%) to less than 25%, based on a total volume of the first layer; a second layer having a porosity of 25% to 80%, based on a total volume of the second layer, wherein the second layer is on the first layer and the second layer has a composition that is different from a composition of the first layer.

The first layer of the component comprising the lithium ion conductor may have a porosity of 0% (no pores) to less than 25%, based on a total volume of the first layer. The porosity of the first layer may be, for example, 0% to less than 25%, 1% to 20%, 5% to 15%, or 7% to 12%, based on a total volume of the first layer of the component.

The first layer in the component comprises a pore, wherein an average pore diameter in the first layer is 1 nanometer (nm) to 50 nm. A pore diameter in the first layer may be, for example, 1 nm to 50 nm, 5 nm to 45 nm, 10 nm to 40 nm, 15 nm to 35 nm, or 20 nm to 30 nm.

In an embodiment, the first layer has a thickness of 0.1 micrometer (μm) to 40 μm. For example, the component may have a thickness of 0.1 μm and 40 μm, 0.5 μm to 35 μm, 1 μm to 30 μm, 5 μm to 25 μm, or 10 μm and 20 μm.

The second layer of the component is on and may be directly on the first layer. The second layer may comprise an oxide. The oxide may comprise at least one of yttrium stabilized zirconia, zirconium oxide, beryllium oxide, zinc oxide, titanium oxide, thorium oxide, yttrium oxide, strontium oxide, calcium oxide, ferric oxide, sodium oxide, aluminum oxide, anodized aluminum oxide, magnesium oxide, or a silicon oxide of the formula SiOx wherein 0≤x≤2. For example, the second layer may comprise thin porous and rigid high temperature ceramics that include, but are not limited to, yttrium stabilized zirconia (e.g., 3 mol % Y-doping) stable up to about 850° C., $Al_2O_3$ available in dense form as thin as 19 micron, stable to about 900° C., anodized alumina oxide, which is stable to about 500° C. with LLZO, or MgO, which is the stable at temperatures equal to and greater than 1200° C.

In an embodiment, the second layer may be, for example, a porous flexible substrate and may include, but is not limited to, ceramic fabric, borosilicate mesh, and polyimide porous high temperature polymers that are stable up to about 400° C.

The second layer of the component may have a porosity of 25% and 80% based on a total volume of the second layer. The porosity of the second layer may be, for example, 25% to 80%, 30% to 75%, 40% to 65%, or 50% to 60%, based on a total volume of the second layer of the component.

In an embodiment, the second layer of the component has a thickness of 10 μm to 150 μm. For example, the second layer may have a thickness of 10 μm to 150 μm, 15 μm to 125 μm, 20 μm to 100 μm, or 30 μm to 75 μm.

When the second layer comprises an oxide, the second layer may have a Young's modulus of equal to or less than 150 megapascals (MPa). For example, the second layer may have a Young's modulus from 10 MPa to 150 MPa, 20 MPa to 140 MPa, 30 MPa to 130 MPa, or 40 MPa to 120 MPa.

In an embodiment, when the second layer comprises an oxide, the second layer may have a Young's modulus of equal to or greater than 150 MPa. For example, the second layer may have a Young's modulus from 150 MPa to 400 MPa, 160 MPa to 350 MPa, 170 MPa to 300 MPa, or 180 MPa to 250 MPa.

In an embodiment, the second layer may comprise at least one of a polymeric material or a fibrous material, wherein the second layer material may have a Young's modulus equal to or less than 100 MPa. The second layer material may have a Young's modulus of 10 MPa to 100 MPa, 20 MPa to 90 MPa, 30 MPa to 80 MPa, or 40 MPa to 70 MPa.

The component may comprise an ionic liquid. Any suitable ionic liquid may be used. An ionic liquid comprises a cation and an anion, and is a liquid at room temperature, e.g., 25° C.

The cation of the ionic liquid may comprise an imidazolium cation, an ammonium cation, a pyrrolidinium cation, or a piperidinium cation. Non-limiting examples of the cation include at least one of a C1 to C12 alkyl ammonium cation, such as triethyl ammonium, an imidazolium cation, such as ethyl methyl imidazolium or butyl methyl imidazolium, a pyrrolidium cation, such as 1-methyl-1-propylpyrrolidium, or a methyl propylpiperidium cation. The ionic liquid may comprise at least one of triethyl ammonium, ethyl methyl imidazolium, butyl methyl imidazolium, 1-methyl-1-propylpyrrolidium, methyl propylpiperidium, bis(trifluoromethylsulfonyl)imide, bis(pentafluoroethylsufonyl)imide, tetrafluoroborate, hexafluorophosphate, poly(1-vinyl-3-alkylimidazolium), a cation of poly(1-allyl-3-alkylimidazolium), or a cation of poly(1-(meth)acryloyloxy-3-alkylimidazolium).

The anion of the ionic liquid may comprise at least one of a bis(fluorosulfonyl)imide, bis(fluorosulfonyl)amide, fluoroborate, or a fluorophosphate. However, embodiments are not limited thereto. Non-limiting examples of the anion include at least one of bis(trifluoromethane)sulfonimide (TFSI), bis(pentafluoroethylsufonyl)imide (BETI), tetrafluoroborate ($BF_4^-$), or hexafluorophosphate ($PF_6^-$). In an embodiment, the ionic liquid may include, for example, [emim] Cl/AiCl$_3$ (wherein emim is ethyl methyl imidazolium), [bmpyr] NTf$_2$, (wherein bmpyr is butyl methyl pyridinium and NTf-trifluoromethanesulfonamide), [bpy] Br/AlCl$_3$ (wherein bpy is 4,4'-bipyridine), [choline] Cl/CrCl$_3$.6H$_2$O, [emim] OTf/[hmim](wherein emim is ethyl methyl imidazolium, hmim is hexyl methyl imidazolium, and OTf is trifluoromethanesulfonate), [choline] Cl/HOCH$_2$CH$_2$OH, [EtMeN(CH$_2$CH$_2$OMe)]BF$_4$ (wherein Et is ethyl, Me is methyl, Pr is propyl, Bu is butyl, Ph is phenyl, Oct is octyl, and Hex is hexyl), [Bu$_3$PCH$_2$CH$_2$CaF$_{17}$]OTf (wherein OTf is trifluoromethanesulfonate), [bmim]PF$_6$ (wherein bmim is butyl methyl imidazolium), [bmim]BF$_4$ (wherein bmim is butyl methyl imidazolium), [omim]PF$_6$ (wherein omim is octyl methyl imidazolium), [Oct$_3$PC$_{18}$H$_{37}$]I (wherein Oct is octyl), [NC(CH$_2$)mim] NTf$_2$ (wherein mim is methyl imidazolium and NTf is trifluoromethanesulfonamide), [Pr$_4$N] [B(CN)$_4$], [bmim] NTf$_2$ (wherein bmim is butyl methyl imidazolium and NTf is trifluoromethanesulfonamide), [bmim]Cl (wherein bmim is butyl methyl imidazolium), [bmim][Me (OCH$_2$CH$_2$)$_2$OSO$_3$] (wherein bmim is butyl methyl imidazolium and Me is methyl), [PhCH$_2$mim]OTf (wherein mim is methyl imidazolium, NTf is trifluoromethanesulfonamide, and OTf is trifluoromethane sulfonate), [Me$_3$NCH(Me)CH(OH)Ph]NTf, (wherein NTf is trifluoromethanesulfonamide, Me is methyl, and Ph is phenyl), [pmim][(HO)$_2$PO$_2$] (wherein pmim is propyl methyl imidazolium), [(6-Me)bquin]NTf$_2$ (wherein bquin is butyl quinolinium), [bmim][Cu$_2$Cl$_3$] (wherein bmim is butyl methyl imidazolium), [C$_{18}$H$_{37}$OCH$_2$mim]BF$_4$ (wherein mim is methyl imidazolium), [heim]PF$_6$ (wherein heim is hexyl ethyl imidazolium and NTf is trifluoromethanesulfonamide), [mim (CH$_2$CH$_2$O)$_2$CH$_2$CH$_2$mim][NTf$_2$]$_2$ (wherein mim is methyl imidazolium), [obim]PF$_6$ (wherein obim is octyl butyl imidazolium), [oquin]NTf$_2$ (wherein oquin is octyl quinolinium and NTf is trifluoromethanesulfonamide), [hmim][PF$_3$(C$_2$F$_5$)$_3$] (wherein hmim is hexyl methyl imidazolium), [C$_{14}$H$_{29}$mim]Br (wherein mim is methyl imidazolium), [Me$_2$N(C$_{12}$H$_{25}$)$_2$]NO$_3$, [emim] BF$_4$ (wherein emim is ethyl methyl imidazolium), [MeN(CH$_2$CH$_2$OH)$_3$], [MeOSO$_3$], [Hex$_3$PC$_{14}$H$_{29}$]NTf$_2$ (wherein NTf is trifluoromethanesulfonamide), [emim][EtOSO$_3$] (wherein emim is ethyl methyl imidazolium and Et is ethyl), [choline][ibuprofenate], [emim]NTf$_2$ (wherein emim is ethyl methyl imidazolium and Ntf is trifluoromethanesulfonamide), [emim][(EtO)$_2$PO$_2$](wherein emim is ethyl methyl imidazolium and Et is ethyl), [emim] Cl/CrCl$_2$ (wherein emim is ethyl methyl imidazolium), or [Hex$_3$PC$_{14}$H$_{29}$]N(CN)$_2$ (wherein Hex is hexyl). However, embodiments are not limited thereto. Any suitable anion may be used in the ionic liquid.

In an embodiment, the ionic liquid may be a polymeric ionic liquid. The polymeric ionic liquid may comprise an organic cation including an imidazolium group. The cation of the polymer ionic liquid may include at least one of poly (1-vinyl-3-alkylimidazolium), poly (1-allyl-3-alkylimidazolium), or of poly(1-(meth)acryloyloxy-3-alkylimidazolium).

The anion of the polymeric ionic liquid may comprise an organic or an inorganic anion. The anion of the polymer ionic liquid may include at least one of CH$_3$COO$^-$, CF$_3$COO$^-$, CH$_3$SO$_3$, CF$_3$SO$_3^-$, (CF$_3$SO$_2$)$_2$N$^-$, (CF$_3$SO$_2$)$_3$C$^-$, (CF$_3$CF$_2$SO$_2$)$_2$N$^-$, C$_4$F$_9$SO$_3^-$, C$_3$F$_7$COO$^-$, or (CF$_3$SO$_2$)(CF$_3$CO)N$^-$.

The ionic liquid may be contained in the component in an amount of greater than 0 weight percent (wt %) to 30 wt %, based on a total weight of the first layer and the second layer. For example, the ionic liquid may be contained in the component in an amount from greater than 0 wt % to 30 wt %, 5 wt % to 25 wt %, or 10 wt % to 20 wt %, based on a total weight of the first layer and the second layer.

In an embodiment, the ionic liquid may be contained in the component in an amount of greater than 0 wt % up to 20 wt %, based on a total weight of the second layer. For example, the ionic liquid may be contained in the second layer in an amount greater than 0 wt % to 20 wt %, 2 wt % to 18 wt %, 4 wt % to 16 wt %, or 8 wt % to 14 wt %, based on a total weight of the second layer.

In an embodiment, the ionic liquid is present in a pore of the second layer.

In an embodiment, the ionic liquid may be contained in the second layer of the component in an amount of 50% to 100% of a total pore volume of the second layer. For example, the ionic liquid may be contained in the second layer in an amount of 50% to 100%, 60% to 98%, 70% to 96%, 80% to 94%, or 90% to 92%, based on a total pore volume of the second layer.

The second layer may comprise any suitable material, and may comprise at least one of an oxide, carbide, nitride, or a metal. A second layer comprising an aluminum oxide comprising iron, titanium, chromium, or copper, magnesium, MgO, $Al_2O_3$, $SiO_2$, indium tin oxide, zinc oxide, indium tin zinc oxide, SiC, Ti, Ni, or stainless steel is disclosed. Use of MgO is mentioned.

In an embodiment, the second layer may be, for example, thin porous and rigid high temperature ceramics that include, but are not limited to, yttrium stabilized zirconia (YSZ, e.g., 3 mol % Y-doping) stable up to about 850° C., $Al_2O_3$ available in dense form as thin as 19 micron, stable to about 900° C., anodized alumina oxide, which is stable to about 500° C. with LLZO, or MgO, which is the stable at temperatures equal to and greater than 1200° C.

In an embodiment, the second layer may be, for example, a porous flexible substrate and may include, but is not limited to, ceramic fabric, borosilicate mesh, and polyimide porous high temperature polymers that are stable up to about 400° C.

In an embodiment, a battery may comprise a lithium ion conductor as described herein. In an embodiment, a lithium battery may comprise: a positive electrode; a negative electrode comprising at least one of lithium or a lithium alloy; and a component comprising the lithium ion conductor between the positive electrode and the negative electrode. In an embodiment, the first layer of the component is proximate to the negative electrode in a lithium battery. In an embodiment, the second layer is proximate to the negative electrode in a lithium battery. A battery comprising the lithium ion conductor may cycle more than 15 times at the designed capacity (0.42 mAh) at 0.1 C (0.139 mA) of a hybrid-type cell.

In an embodiment, a method of preparing a lithium ion conductor comprises: providing a substrate; heating the substrate; providing a mixture comprising a nitrogen precursor, a lithium precursor, a lanthanum precursor, an aluminum precursor, a zirconium precursor, and a solvent; and contacting the heated substrate with the mixture to prepare the lithium ion conductor, wherein the lithium ion conductor comprises a compound represented by a Formula 1,

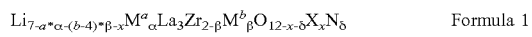

$$Li_{7-a*\alpha-(b-4)*\beta-x}M^a_\alpha La_3 Zr_{2-\beta}M^b_\beta O_{12-x-\delta}X_x N_\delta \quad \text{Formula 1}$$

wherein in Formula 1,
$M^a$ is a cationic element having a valence of a,
$M^b$ is a cationic element having a valence of b, and
X is an anion having a valence of −1,
wherein, when $M^a$ comprises H, $0 \le \alpha \le 5$, otherwise $0 \le \alpha \le 0.75$, and wherein $0 \le \beta \le 1.5$, $0 \le x \le 1.5$, $(a*\alpha + (b-4)\beta + x) > 0$, and $0 < \delta \le 6$.

The substrate may comprise any suitable oxide. The substrate may be at least one of yttrium stabilized zirconia, aluminum oxide, anodized aluminum oxide, magnesium oxide, or a silicon oxide of the formula SiOx wherein $0 \le x \le 2$.

In an embodiment, the heating may comprise heating the substrate to a temperature from 200° C. to 450° C., wherein the substrate is heated during the contacting step. For example, the heating step may comprise heating the substrate to a temperature of 200° C. to 450° C., 250° C. to 400° C., or 300° C. to 350° C.

The mixture may be provided using a single precursor composition, the precursor composition comprising a compound comprising nitrogen, a compound comprising lithium, a compound comprising lanthanum, and a compound comprising zirconium, and may further comprise a compound comprising aluminum. Suitable compounds for the precursor include at least one of an oxide, hydroxide, nitrate, azide, carbonate, oxalate, peroxide, acetate, or acetylacetonate.

Alternatively, the mixture may be provided by contacting a first precursor composition and a second precursor composition.

The first precursor composition comprises a lanthanum precursor, an aluminum precursor, a zirconium precursor, and a first solvent. Each of the lanthanum precursor, the aluminum precursor, and the zirconium precursor can be an oxide, hydroxide, nitrate, azide, carbonate, oxalate, peroxide, acetate, or acetylacetonate.

The second precursor composition comprises a lithium precursor and a second solvent, wherein the second solvent is the same or different than the first solvent. The lithium precursor comprises lithium azide and lithium nitrate, and may further comprise an oxide, hydroxide, nitrate, azide, carbonate, oxalate, peroxide, acetate, or acetylacetonate of lithium.

Representative precursor compounds comprising nitrogen include lithium nitrate, lithium azide, lanthanum nitrate, zirconium nitrate, or aluminum nitrate.

Representative precursor compounds comprising lithium include lithium oxide, lithium hydroxide, lithium nitrate, lithium carbonate, lithium oxalate, lithium peroxide, lithium acetate, or lithium acetoacetate.

Representative precursor compounds comprising lanthanum include lanthanum oxide, lanthanum hydroxide, lanthanum nitrate, lanthanum carbonate, lanthanum oxalate, lanthanum peroxide, lanthanum acetate, or lanthanum acetoacetate.

Representative precursor compounds comprising zirconium include zirconium oxide, zirconium hydroxide, zirconium nitrate, zirconium carbonate, zirconium oxalate, zirconium peroxide, zirconium acetate, or zirconium acetoacetate.

Representative precursor compounds comprising aluminum include aluminum oxide, aluminum hydroxide, aluminum nitrate, aluminum carbonate, aluminum oxalate, aluminum peroxide, aluminum acetate, or aluminum acetoacetate.

Also disclosed are precursor compounds that provide a combination of nitrogen, lithium, lanthanum, or zirconium, and optionally aluminum, e.g., a nitrate comprising a combination of lithium, lanthanum, or zirconium, and optionally aluminum.

If desired, the precursor compound may be a hydrate. For example, use of $La(NO_3)_3 \cdot 6H_2O$ or $Al(NO_3)_3 \cdot 9H_2O$ is mentioned.

Use of $Li_2O$ or Li—N($LiN_3$, $Li_3N$, $LiNO_3$) with at least one of BeO, CaO, $Sc_2O_3$, $Y_2O_3$, $HfO_2$, $La_2O_3$, $ZrO_2$, $BH_4$, or $P_2O_5$ is mentioned. The precursor compounds may also be halogen containing compounds such as KCl, LiI, LiF, LiCl, LiBr, $SrCl_2$, or certain glass formers such as $SiO_2$.

The mixture for forming the lithium ion conductor may be a solution or a suspension of the precursors in the solvent. In an embodiment, the mixture is a solution of the precursor compounds in the solvent. Use of a suspension is mentioned.

The solvent may comprise at least one of a substituted or unsubstituted C1 to C20 alcohol, a substituted or unsubstituted C1 to C20 ester, a substituted or unsubstituted C2 to C20 carbonate, a substituted or unsubstituted C1 to C20 ketone, or water.

Use of a substituted or unsubstituted alcohol, a substituted or unsubstituted ester, a substituted or unsubstituted carbonate, or a substituted or unsubstituted ketone is mentioned. In an embodiment, the solvent comprises a substituted or unsubstituted C1 to C6 alcohol. Use of methanol is mentioned. In an embodiment, disclosed is a composition for forming the solid-state electrolyte comprising a solution of the starting materials in methanol.

A boiling point of the solvent can be 0° C. to 150° C., 5° C. to 125° C., 10° C. to 100° C., or 20° C. to 80° C. In an embodiment, the solvent has a boiling point of 20° C. to 90° C.

The concentration of the precursors in the solvent may be a concentration which is suitable for spray pyrolysis. In an embodiment, the concentration of the precursor compound in the solvent is 0.001 to 1 molar (M), 0.005 to 0.5 M, or 0.01 to 0.1 M. Use of a precursor concentration of 0.02 to 0.08 M is mentioned.

In an embodiment, in a method of manufacturing a lithium ion conductor for a lithium battery, the contacting step comprises using spray pyrolysis of the mixture to form a lithium ion conductor of Formula 1 on the surface of the substrate.

In an embodiment, the lithium ion conductor further comprises a compound of Formula 2,

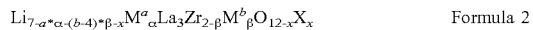

Formula 2 wherein in Formula 2, $M^a$ is a cationic element having a valence of a, $M^b$ is a cationic element having a valence of b, and X is an anion having a valence of −1, wherein, when $M^a$ comprises H, $0 \leq \alpha \leq 5$, otherwise $0 \leq \alpha \leq 0.75$, and wherein $0 \leq \beta \leq 1.5$, $0 \leq x \leq 1.5$, and $(a^*\alpha+(b-4)\beta+x) > 0$.

In an embodiment, the method comprises annealing the lithium ion conductor at a temperature of 300° C. to 1200° C. The annealing temperature may be, for example, 300° C. to 1200° C., 400° C. to 1100° C., 500° C. to 1000° C., 600° C. to 900° C., or 700° C. to 800° C.

The substrate may be porous. The substrate may have an average pore diameter from 1 nm to 50 nm. A pore diameter in the second layer may be, for example 1 nm to 50 nm, 5 nm to 45 nm, 10 nm to 40 nm, 15 nm to 35 nm, or 20 nm to 30 nm.

In an embodiment, a method for manufacturing a lithium ion conductor comprises disposing an ionic liquid in a pore of the substrate.

The ionic liquid is disclosed above, and a repetitive description thereof is not repeated here for clarity. In an embodiment, use of an alkyl ammonium cation, such as triethyl ammonium, an imidazolium cation such as ethyl methyl imidazolium or butyl methyl imidazolium, a pyrrolidium such as 1-methyl-1-propylpyrrolidium, or a methyl propylpiperidium is mentioned. An anion of bis(trifluoromethylsulfonyl) imide (TFSI), bis (pentafluoroethylsufonyl) imide (BETI), tetrafluoroborate (BF4-), or hexafluorophosphate (PF6-) is mentioned. For example, the ionic liquid may be triethyl ammonium, ethyl methyl imidazolium, butyl methyl imidazolium, 1-methyl-1-propylpyrrolidium, methyl propylpiperidium, bis(trifluoromethylsulfonyl)imide, bis (pentafluoroethylsufonyl)imide, tetrafluoroborate, hexafluorophosphate, poly(1-vinyl-3-alkylimidazolium), a cation of poly(1-allyl-3-alkylimidazolium), or a cation of poly(1-(meth)acryloyloxy-3-alkylimidazolium).

The ionic liquid may be contained in the lithium ion conductor in an amount greater than 0 wt % up to 30 wt %, based on a total weight of the first layer and the second layer. For example, the ionic liquid may be contained in the substrate in an amount from greater than 0 wt % to 30 wt %, 5 wt % to 25 wt %, or 10 wt % to 20 wt %, based on a total weight of the first layer and the second layer.

In an embodiment, the ionic liquid may be contained in the substrate in an amount greater than 0 wt % up to 20 wt %, based on a total weight of the second layer. For example, the ionic liquid may be contained in the substrate in an amount greater than 0 wt % to 20 wt %, 2 wt % to 18 wt %, 4 wt % to 16 wt %, or 8 wt % to 14 wt %, based on a total weight of the substrate.

In an embodiment, the ionic liquid may be contained in the substrate in an amount of 50% to 100% of a total pore volume of the substrate. For example, the ionic liquid may be contained in the substrate in a volume equivalent to 50% to 100%, 60% to 100%, 70% to 100%, 80% to 100%, or 90% to 100%, based on a total pore volume of the substrate.

In an embodiment, the method comprises annealing the lithium ion conductor at a temperature of 300° C. to 1200° C. The annealing temperature may be, for example, 400° C. to 1100° C., 500° C. to 1000° C., 600° C. to 900° C., or 700° C. to 800° C.

The annealing can be conducted in any suitable atmosphere. Annealing in air or oxygen (02) is mentioned. In an embodiment, the annealing is conducted in a gas comprising oxygen at a content greater than that in air, e.g., a gas comprising 21% to 100%, 25% to 90%, or 30% to 80% oxygen, based on a total volume of the gas.

In an embodiment, the lithium ion conductor does not react with lithium, i.e., is stable in the presence of lithium.

In an embodiment, the nitrides that are deposited can either remain in the film or be annealed away to form cubic single phase LLZO. In an embodiment, a dense LLZO layer can be successfully deposited onto a porous yttrium-stabilized zirconia (YSZ) separator.

In an embodiment, the lithium ion conductor can be provided by spray-pyrolysis using thin-film fabrication, which allows for a crystalline or amorphous separator layer to be formed with high conductivity and good stability against lithium metal reduction.

In an embodiment, a method of manufacturing a component for a lithium battery comprises: providing a substrate having a porosity of 25% to 80%, based on a total volume of the substrate; heating the substrate; contacting the heated substrate with the mixture comprising a nitrogen precursor, the lithium precursor, the lanthanum precursor, the aluminum precursor, the zirconium precursor, and the solvent to prepare the lithium ion conductor comprising the compound represented by a Formula 1 on the substrate to manufacture the component, wherein the first layer comprises the lithium ion conductor and has a porosity of 0% to less than 25%, based on a total volume of the first layer, and wherein the second layer comprises the substrate.

The porosity of each layer of the lithium ion conductor and the substrate may be determined by scanning electron microscopy, the details of which can be determined by one of skill in the art without undue experimentation.

In an embodiment, a protected positive active material comprises: a positive active material; and a coating layer on the surface of the positive active material, wherein the coating layer comprises the lithium ion conductor comprises a compound represented by Formula 1.

Lithium lanthanum zirconium oxide (LLZO) garnet-type solid-state electrolytes are currently synthesized by bulk-type methods, e.g., sintering a pressed pellet, or sintering a compressed tape. The products of the bulk-type methods can have desirable conductivity, however the processing methods, while suitable for laboratory setting, are difficult to economically implement in a manufacturing environment.

Alternatively, methods to provide thin-films of LLZO by vacuum techniques are known, however such methods are economically unsuitable for scalable production.

The disclosed method provides a lithium ion conductor having desirable thickness and conductivity, and selective surface morphology. The disclosed method for preparing the lithium ion conductor is scalable and has associated costs that are suitable for commercial manufacturing.

A schematic diagram of the disclosed method is provided in FIG. 1. In the disclosed method, a film of a precursor composition 100 is first formed on a substrate 110 to form a component 120 comprising the substrate 110 having a precursor film 130 thereon. The precursor film 130 is then annealed at 300° C. to 1200° C. to manufacture the component 120. As disclosed herein, the method provides a film of comprising a solid-state electrolyte comprising a compound of Formula 1 having a selected thickness, reduced defect content, selected surface roughness, and a desirable content of Formula 1.

Figure 2:
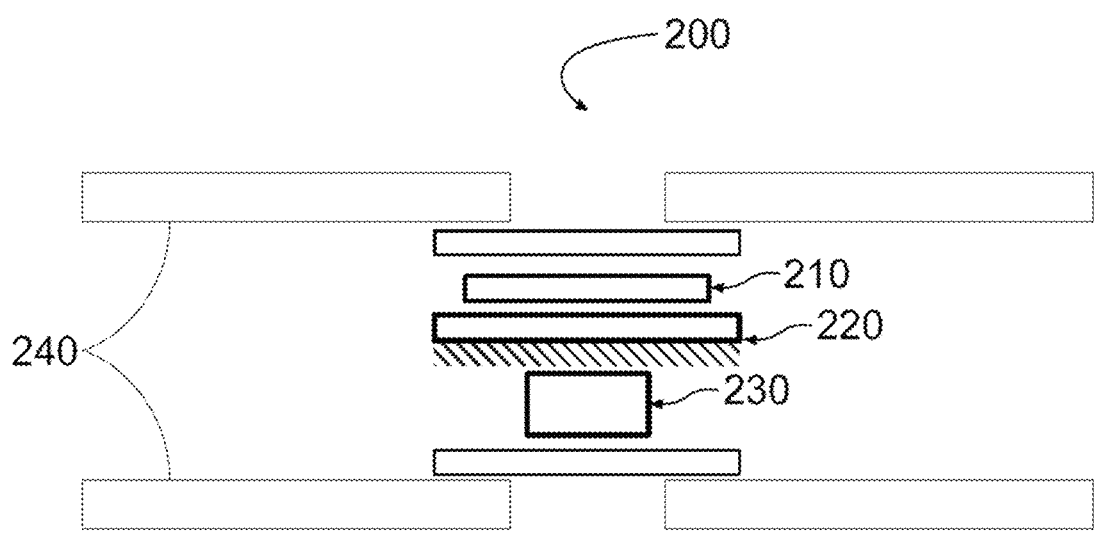
FIG. 2 is a schematic diagram of an embodiment of a lithium battery.

Also disclosed is a lithium battery comprising the lithium ion conductor in at least one of a positive electrode, a separator, or a negative electrode. As shown in the electrochemical cell 200 of FIG. 2, the negative electrode 210 can be used in combination with a positive electrode 230 comprising the positive active material and a separator 220, e.g., a separator comprising the lithium ion conductor, provided between the positive electrode and the negative electrode. The electrochemical cell may be disposed in an pouch 240.

Figure 3A:
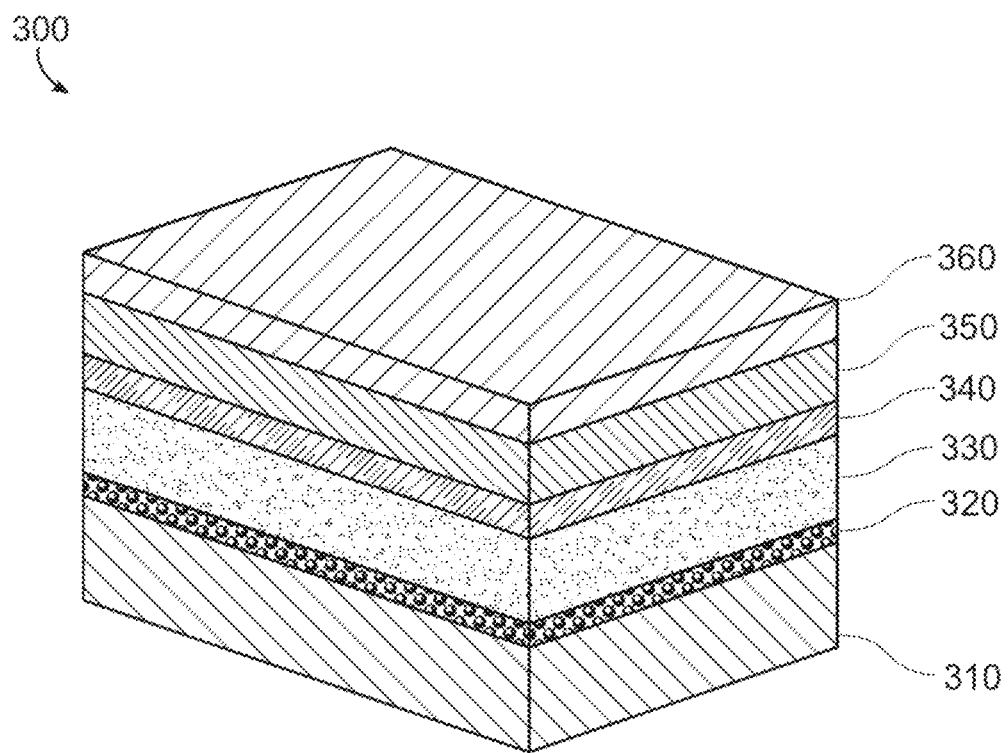
FIG. 3A is a schematic diagram of an embodiment of a lithium battery.

In an embodiment, as shown in FIG. 3A, an electrochemical cell 300 may comprise a porous layer 330 on the lithium ion conductor layer 340. Shown in FIG. 3A is a positive electrode current collector 310, a positive electrode 320 comprising a positive electrode active material and a liquid electrolyte, a porous substrate 330, the lithium ion conductor layer 340, a negative electrode 350, and a negative electrode current collector 360.

Figure 3B:
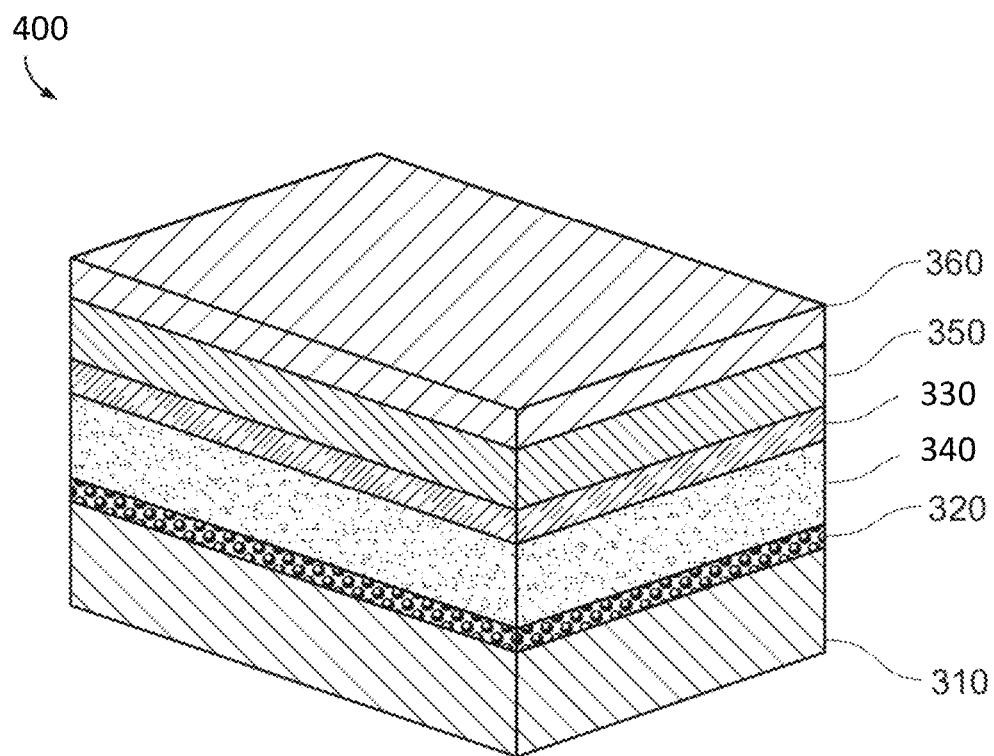
FIG. 3B is a schematic diagram of an embodiment of a lithium battery.
Figure 4:
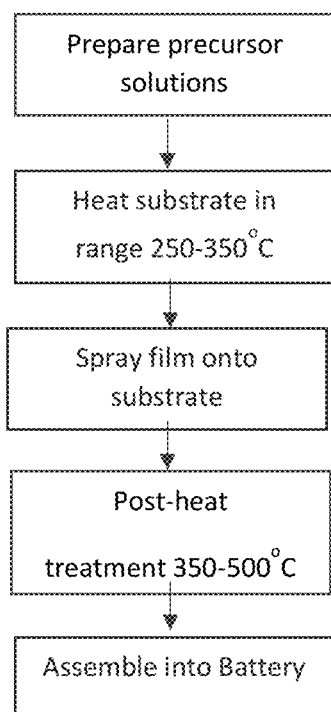
FIG. 4 is a schematic illustration of a method according to an embodiment for preparing a lithium ion conductor.

In an embodiment, as shown in FIG. 3B, an electrochemical cell 400 may comprise a lithium ion conductor 340 on a porous layer 330. Shown in FIG. 3B is a positive electrode current collector 310, a positive electrode 320 comprising a positive electrode active material and a liquid electrolyte, the lithium ion conductor 340, the porous layer 330, a negative electrode 350, and a negative electrode current collector 360.

The positive electrode can be prepared by forming the lithium ion conductor comprising a compound of Formula 1 on a current collector. The current collector may comprise aluminum, for example.

The positive active material can comprise a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: $Li_aA_{1-b}M_bD_2$ wherein $0.90 \leq a \leq 1.8$ and $0 \leq b \leq 0.5$; $Li_aE_{1-b}M_bO_{2-c}D_c$ wherein $0.90 \leq a \leq 1.8$, $0 \leq b \leq 0.5$, and $0 \leq c \leq 0.05$; $LiE_{2-b}M_bO_{4-c}D_c$ wherein $0 \leq b \leq 0.5$ and $0 \leq c \leq 0.05$; $Li_aNi_{1-b-c}Co_bM_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Co_bM_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Co_bM_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2GbO_4$ wherein $0.90 \leq a \leq 1.8$ and $0.001 \leq b \leq 0.1$; $QO_2$; $QS_2$; $LiQS_2$; $V_2O_5$; $LiV_2O_5$; $LiRO_2$; $LiNiVO_4$; $Li_{(3-f)}J_2(PO_4)_3$ $(0 \leq f \leq 2)$; $Li_{(3-f)}Fe_2(PO_4)_3$ wherein $0 \leq f \leq 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x is 1 or 2, $LiNi_{1-x}Mn_xO_{2x}$ where $0 < x < 1$, $LiNi_{1-x-y}Co_xMn_yO_2$ where $0 \leq x \leq 0.5$ and $0 \leq y \leq 0.5$, $LiFePO_4$, $TiS_2$, $FeS_2$, $TiS_3$, and $FeS_3$.

The lithium ion conductor may further include a conductive agent and a binder. Any suitable conductive agent and binder may be used.

A binder can facilitate adherence between components of the electrode, such as the positive active material and the conductor, and adherence of the electrode to a current collector. Examples of the binder can include at least one of polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, or a copolymer thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, at least one of carbon black, carbon fiber, graphite, carbon nanotubes, or graphene. The carbon black can be, for example, acetylene black, Ketjen black, Super P carbon, channel black, furnace black, lamp black, or thermal black. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The lithium ion conductor may be prepared by screen printing, slurry casting, or powder compression. However, the solid-state method is not limited thereto, and any suitable method may be used. The current collector may comprise aluminum, for example.

The positive electrode can further comprise an electrolyte. When present, the electrolyte can comprise at least one of a solid-state electrolyte or a polymeric electrolyte.

The polymeric electrolyte may comprise at least one of an ionically conductive polymer. Exemplary ionically conductive polymers can include but are not limited to polyethylene oxide, polyethylene oxide comprising a metal salt, poly (methyl (meth)acrylate), polypropylene oxide, polyvinylidene fluoride, polystyrene, polyvinyl chloride, polyvinyl alcohol, polyacrylonitrile, or polyester sulfide. The ionically conductive polymer can optionally comprise a lithium salt, for example at least one of $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, or $LiAlCl_4$. In an embodiment, the ionically conductive polymer comprises the lithium salt, and is preferably a polyethylene oxide comprising the lithium salt.

The component may be included between the positive electrode and negative electrode. In an embodiment, the component consists of the dense layer on a substrate. In an embodiment the component comprises at least one of a glass fiber, polyester, polyethylene, polypropylene, or polytetrafluoroethylene (PTFE). In an embodiment, the component may comprise a microporous polymeric film, such as a microporous polyethylene or microporous polypropylene film. In an embodiment, the component comprises the lithium ion conductor and a porous olefin film such as polyethylene and polypropylene.

The negative electrode can be produced from a negative active material composition including a negative active material, and optionally, a conductive agent, and a binder. A suitable negative active material includes a material capable of storing and releasing lithium ions electrochemically.

In an embodiment the negative active material is disposed on a current collector, such as copper current collector. Use of lithium metal or a lithium metal alloy is mentioned. The negative electrode active material may comprise a carbon, such as a hard carbon, soft carbon, carbon black, ketjen black, acetylene black, activated carbon, carbon nanotubes, carbon fiber, graphite, or an amorphous carbon. Also usable are lithium-containing metals and alloys, for example a lithium alloy comprising at least one of Si, Sn, Sb, or Ge. Lithium-containing metal oxides, metal nitrides, and metal sulfides are also useful, in particular wherein the metal can be at least one of Ti, Mo, Sn, Fe, Sb, Co, or V. Also useable are phosphorous (P) or metal doped phosphorous (e.g., $NiP_3$). The negative active material is not limited to the foregoing and any suitable negative active material can be used. In an embodiment the negative active material is disposed on a current collector, such as copper current collector.

In an embodiment, the negative electrode comprises graphite. In an embodiment, the negative electrode comprises lithium metal or a lithium metal alloy. Use of lithium metal is mentioned.

The electrochemical cell can be made by a method comprising disposing the component between a positive electrode and a negative electrode and inserting the assembly into a can, for example, to provide the electrochemical cell.

Hereinafter an embodiment is described in detail. The examples are provided for illustrative purposes only and are not intended to limit the scope of the present disclosure.

EXAMPLES

Example 1. Preparation of Dense Layer on Porous Substrate

All chemicals can be used as received without further purification. $LiN_3$ (≥99%), and zirconium(IV) acetylacetonate (97%) were purchased from SIGMA-ALDRICH; $Al(NO_3)_3 \cdot 9H_2O$ and $La(NO_3)_3 \cdot 6H_2O$ (99.99%) were purchased from ALFA AESAR; methanol and 1-methoxy-2-propanol bis(2-ethylhexyl)phthalate were purchased from VWR INTERNATIONAL; and YSZ (100) substrates were purchased from MTI CORPORATION.

A first precursor composition was prepared by dissolving stoichiometric ratios of the La, Al, and Zr salts in methanol and 1-methoxy-2-propanol bis(2-ethylhexyl)phthalate. A second precursor composition was prepared by adding a 250% stoichiometric excess of the Li salt for $Li_{7-a*\alpha-(b-4)*\beta-x}M^a{}_\alpha La_3Zr_{2-\beta}M^b{}_\beta O_{12-x-\delta}X_x N_\delta$ (Formula 1), e.g., $M^a$ is $Al^{3+}$, $\alpha$ is 0.25, b, x, and $\beta$ are 0, and $\delta$ is 2 ($Li_{6.25}Al_{0.25}La_3Zr_2O_{10}N_2$), at a concentration of 0.03 mole of per liter in methanol and 1-methoxy-2-propanol bis(2-ethylhexyl)phthalate. The precursor compositions were combined to form a precursor mixture immediately prior to atomization to prevent flocculation prior to being deposited on the substrate. The substrate was maintained at a temperature of 300° C. during deposition of the precursor mixture.

Spray pyrolysis was used to transfer the precursor mixture on to the surface of a 1 cm×1 cm YSZ substrate. The resulting film formed on the YSZ substrate has a thickness of 10 μm. The thickness of the YSZ substrate was 40 μm, thus the bilayer component had a total thickness of 50 μm.

The bilayer component was then annealed at a temperature of 550° C. for 2 hours.

Example 2. Preparation of Dense Layer on Porous Substrate

All chemicals can be used as received without further purification. $LiN_3$ (≥99%), and Zirconium(IV) acetylacetonate (97%) were purchased from SIGMA-ALDRICH; $Al(NO_3)_3 \cdot 9H_2O$ and $La(NO_3)_3 \cdot 6H_2O$ (99.99%) were purchased from ALFA AESAR; methanol and 1-methoxy-2-propanol bis(2-ethylhexyl)phthalate were purchased from VWR INTERNATIONAL; and YSZ (100) substrates were purchased from MTI CORPORATION.

A first precursor composition was prepared by dissolving stoichiometric ratios of the La, Al, and Zr salts in methanol and 1-methoxy-2-propanol bis(2-ethylhexyl)phthalate. A second precursor composition was prepared by adding a 75% stoichiometric excess of the Li salt for $Li_{7-a*\alpha-(b-4)*\beta-x}M^a{}_\alpha La_3Zr_{2-\beta}M^b{}_\beta O_{12-x-\delta}X_x N_\delta$ (Formula 1), e.g., $M^a$ is $Al^{3+}$, $\alpha$ is 0.25, b, x, and $\beta$ are 0, and $\delta$ is 2 ($Li_{6.25}Al_{0.25}La_3Zr_2O_{10}N_2$), at a concentration of 0.03 mole of per liter in methanol and 1-methoxy-2-propanol bis(2-ethylhexyl)phthalate. The precursor compositions were combined to form a precursor mixture immediately prior to atomization to prevent flocculation prior to being deposited on the substrate. The substrate was maintained at a temperature of 300° C. during deposition of the precursor mixture.

Spray pyrolysis was used to transfer the precursor mixture on to the surface of a 1 cm×1 cm YSZ substrate. The resulting film formed on the YSZ substrate has a thickness of 10 μm. The thickness of the YSZ substrate was 40 μm, thus the bilayer component had a total thickness of 50 μm.

The bilayer component was then annealed at a temperature of 700° C. for 2 hours.

X-ray Photoelectron Analysis

X-ray photoelectron spectroscopy (XPS) for N1s was performed using a THERMO K-Alpha XPS system with a spot size of 400 μm and a resolution of 0.1 eV.

Figure 5:
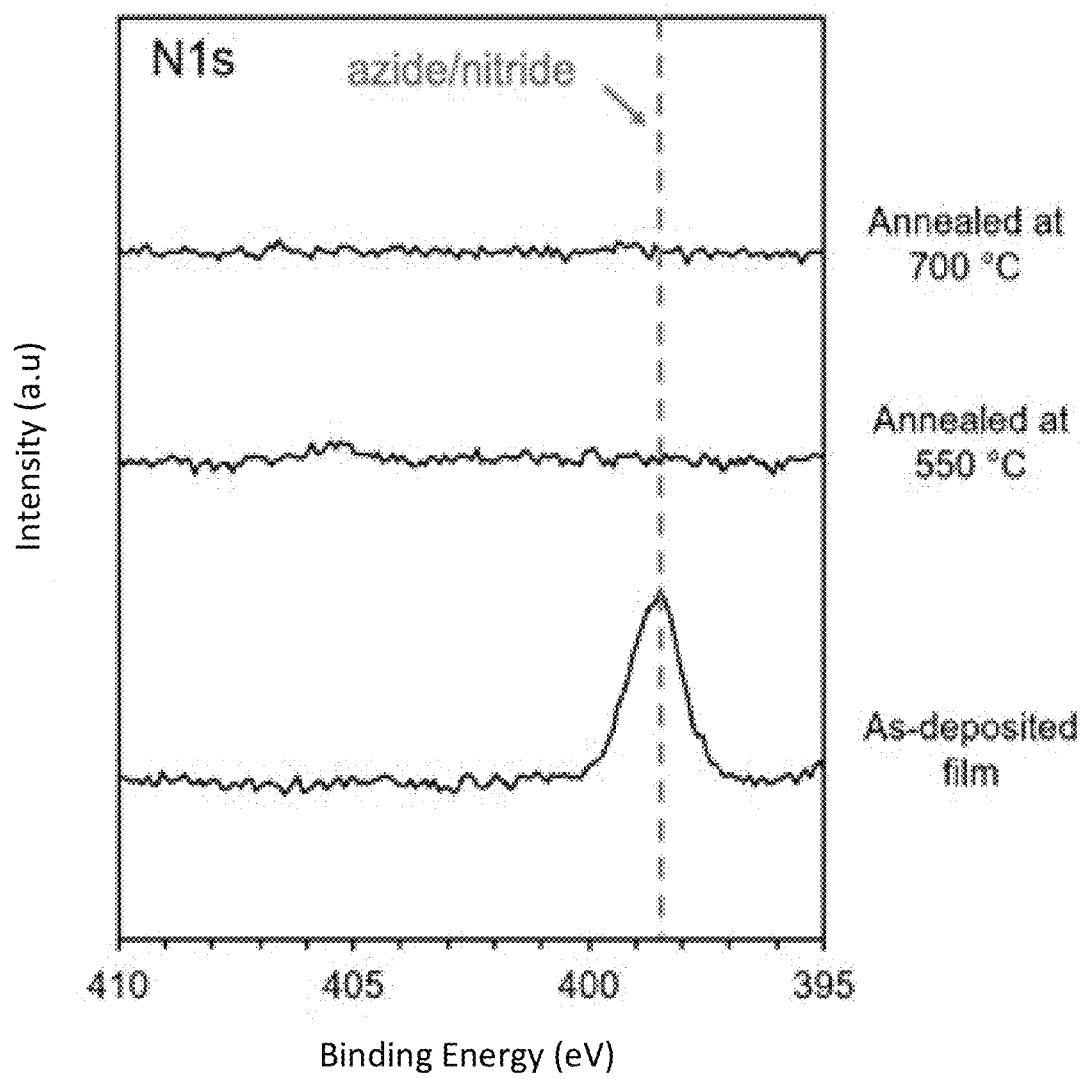
FIG. 5 is a graph of intensity (arbitrary units, a.u.) versus binding energy (electronvolts, eV) showing the results of X-Ray photoelectron spectroscopy (XPS) analysis of Example 1.

Shown in FIG. 5 are XPS results for Examples 1 and 2. From the XPS results, nitrogen is observed to be present in the precursor film as deposited but not in the solid-state electrolyte of Examples 1 and 2. While not wanting to be bound by theory, it is understood that these results indicate complete decomposition of the precursors after annealing e.g., above 550° C., to provide LLZO films comprising a single cubic phase. The atomic percentage of nitrogen is 6.5 atomic percent in the as-deposited film. The atomic percentage can vary depending on the molarity of the nitrogen precursor used. In all cases, nitrogen is not detected at temperatures above 550° C.

X-ray Diffraction Analysis

Figure 6A:
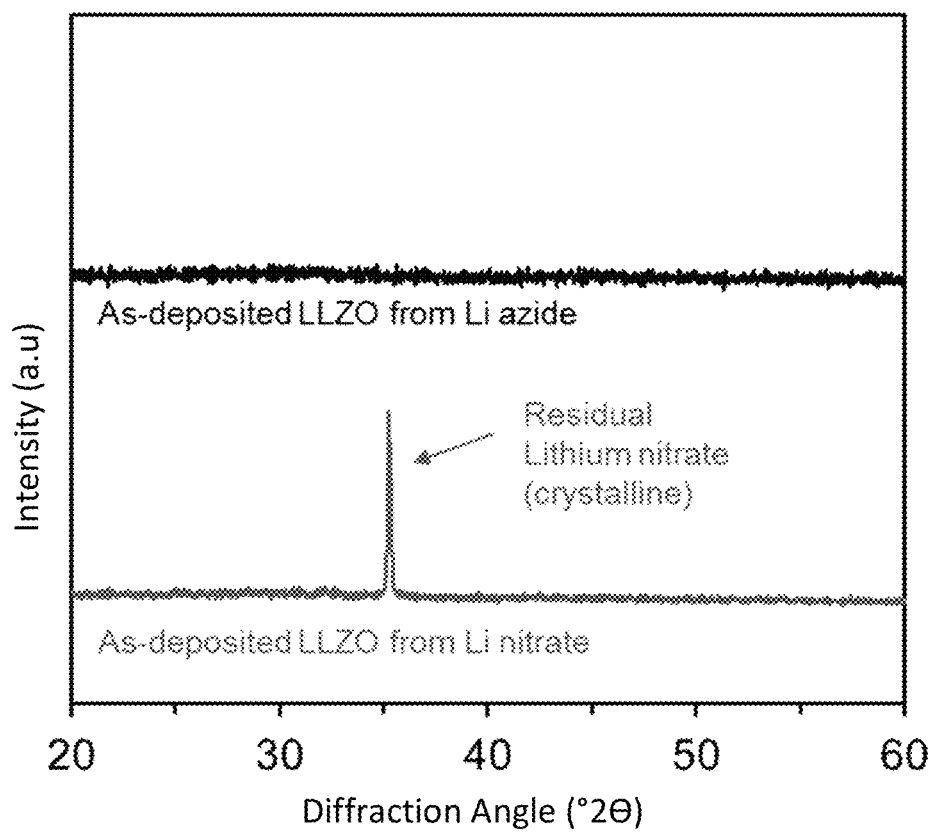
FIG. 6A is a graph of intensity (arbitrary units) versus diffraction angle (°2θ) that shows the results of powder X-ray diffraction (XRD) analysis using Cu Kα radiation of the lithium ion conductor prepared according to Examples 1 and 2, prior to annealing.

FIG. 6A shows that crystalline lithium nitrate may be observed in an as deposited film when a lithium nitrate is used as a precursor compound but nitrogen may not be detected in an as deposited film when a lithium azide precursor compound is used. The films were analyzed using powder X-ray diffraction (XRD) using Cu Kα radiation.

Figure 7:
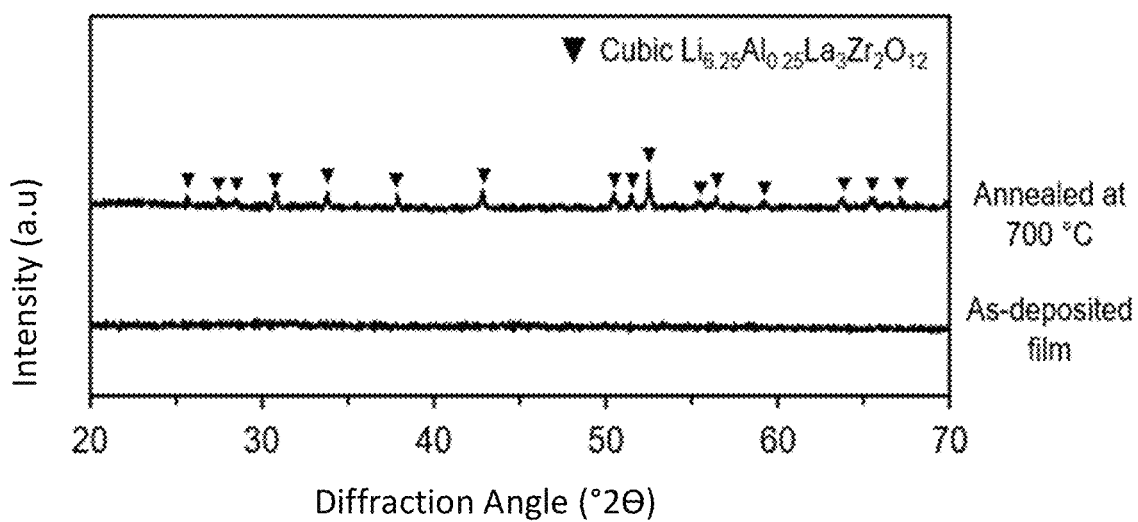
FIG. 7 is a graph of intensity (arbitrary units) versus diffraction angle (°2θ) that shows the results of powder X-ray diffraction (XRD) analysis, using Cu Kα radiation, of the dense layer prepared according to Example 1, prior to annealing, and Example 2, after annealing.

FIG. 7 is a graph of intensity (arbitrary units) versus diffraction angle (°2θ) that shows the results of powder X-ray diffraction (XRD) analysis, using Cu Kα radiation of the dense layer prepared according to Example 2. FIG. 7 shows the XRD results of Example 2 as deposited (prior to annealing) and after annealing at a temperature of 700° C. FIG. 7 also contains calculated peak position locations based on a cubic LLZO structure.

SEM Analysis

Figure 6B:
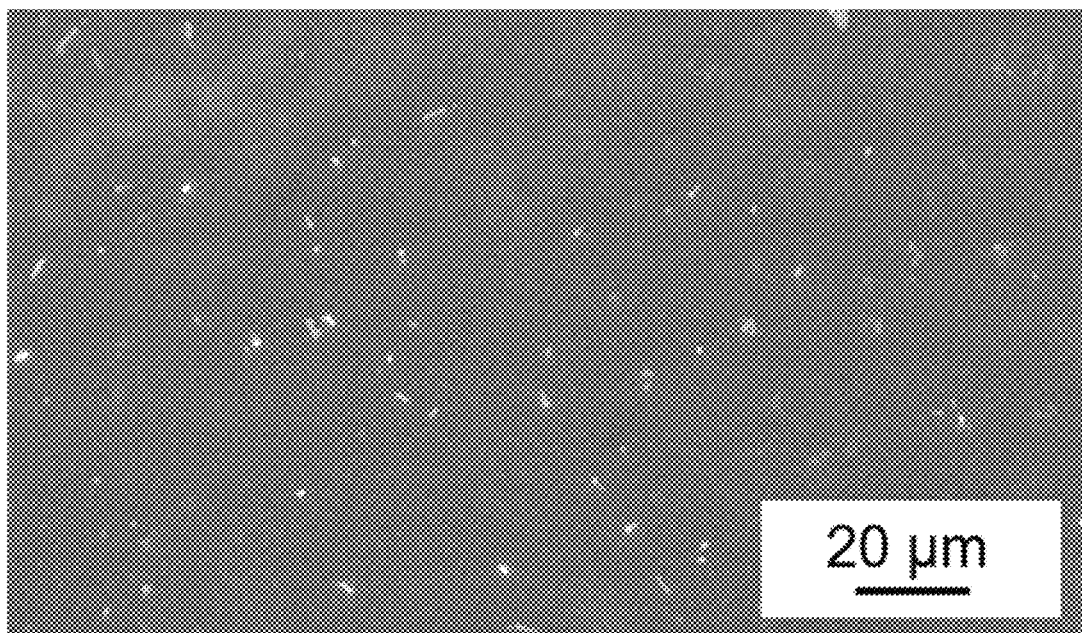
FIG. 6B is a SEM image of the surface of the lithium ion conductor comprising a lithium azide.
Figure 6C:
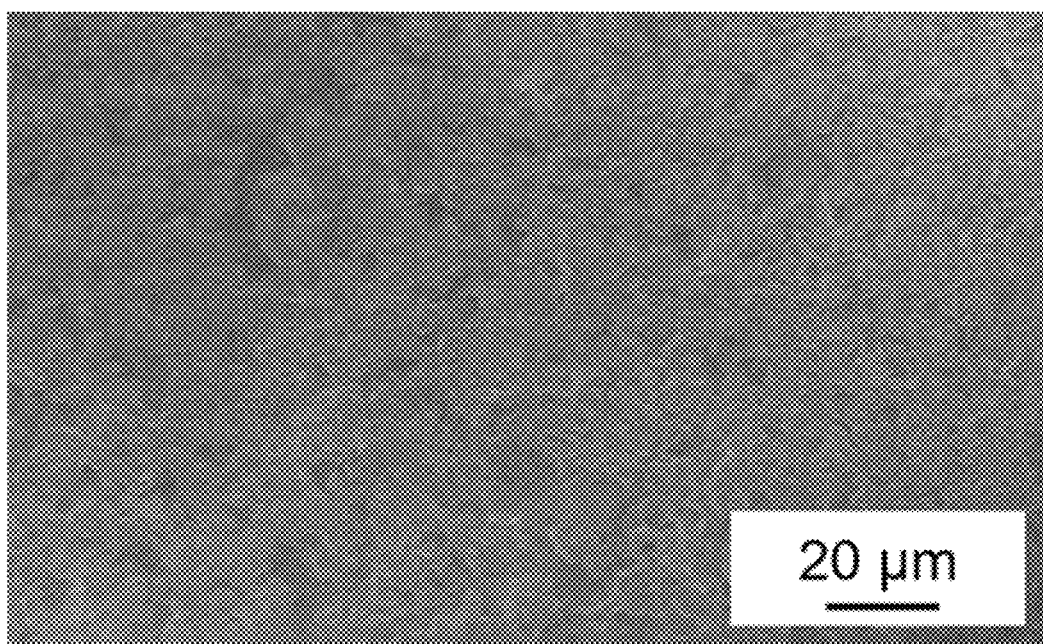
FIG. 6C is a SEM image of the surface of the lithium ion conductor comprising a lithium nitrate.

Scanning electron microscopy (SEM) images were collected on a ZEISS Supra55VP field emission scanning electron microscope operated from 3.0 to 10.0 kV using both the in-lens secondary electron (SE) and the Everhart-Thornley SE detectors. Samples were cross sectioned with a diamond blade and attached to sample stage with carbon-conductive tape. FIG. 6B and FIG. 6C are SEM images that confirm that a smooth amorphous film is formed without an annealing step when lithium nitrate and lithium azide precursors are used to form the lithium ion conductor. As shown in FIG. 6B and FIG. 6C, few if any defects are observed and the resulting surface is visibly dense.

Arrhenius Analysis

Figure 8:
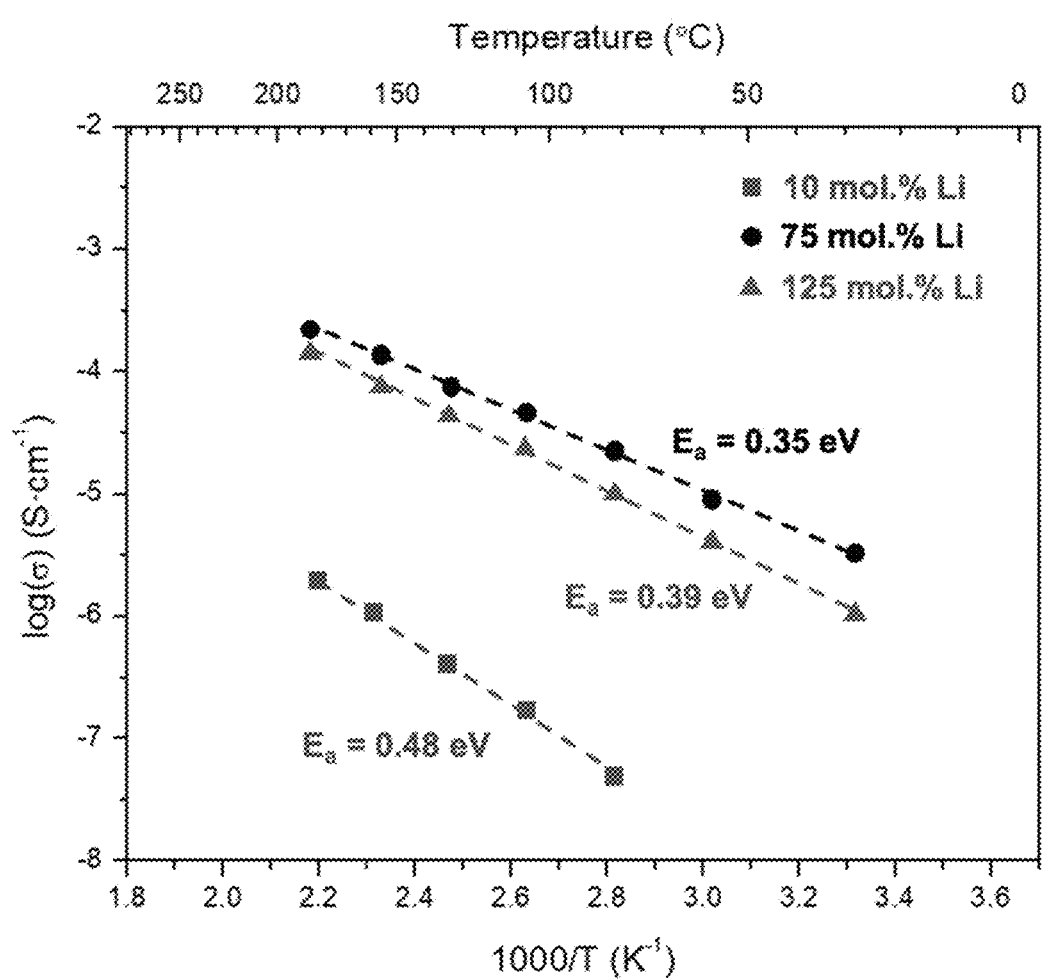
FIG. 8 is an Arrhenius plot of the logarithm of conductivity (siemens per centimeter, S cm$^{-1}$) versus inverse temperature (1000/T, K$^{-1}$), which illustrates the activation energy of an embodiment.

FIG. 8 is an Arrhenius plot of the logarithm of conductivity (siemens per centimeter, S/cm) versus inverse temperature ($1000/T$, $K^{-1}$), which illustrates the activation energy of an embodiment. A low activation energy was measured for the sprayed films of Examples 1 and 2. The activation energy of Examples 1 and 2 is comparable to that of microcrystalline pellet Li-garnets (e.g. 0.35 eV).

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It is understood that the positive electrode could alternatively be referred to as a cathode, and the negative electrode as an anode.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Substituted" means that the compound is substituted with at least one (e.g., 1, 2, 3, or 4) substituent, and the substituents are independently a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (=N—NH$_2$), a carbonyl (—C(=O)—), a carbamoyl group (—C(O)NH$_2$), a sulfonyl (—S(=O)$_2$—), a thiol (—SH), a thiocyano (—SCN), a tosyl ($CH_3C_6H_4SO_2$—), a carboxylic acid (—C(=O)OH), a carboxylic C1 to C6 alkyl ester (—C(=O)OR wherein R is a C1 to C6 alkyl group), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, or a C3 to C12 heteroaryl instead of hydrogen, provided that the substituted atom's normal valence is not exceeded. The indicated number of carbon atoms for any group herein is exclusive of any substituents.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed:

1. A lithium ion conductor comprising a compound of Formula 1:

$$Li_{7-a*\alpha-(b-4)*\beta-x}M^a{}_\alpha La_3 Zr_{2-\beta}M^b{}_\beta O_{12-x-\delta}X_x N_\delta \qquad \text{Formula 1}$$

wherein in Formula 1,
$M^a$ is a cationic element having a valence of a,
$M^b$ is a cationic element having a valence of b, and
X is an anion having a valence of −1,
wherein, when $M^a$ includes H, $0 \leq \alpha \leq 5$, otherwise $0 \leq \alpha \leq 0.75$,
wherein $0 < \beta \leq 1.5$, $0 \leq x \leq 1.5$, $(a*\alpha+(b-4)\beta+x) > 0$, and $0 < \delta \leq 6$, and
wherein a Zr crystallographic site comprises $M^b$ disposed thereon.

2. The lithium ion conductor of claim 1, wherein the compound represented by Formula 1 is amorphous.

3. The lithium ion conductor of claim 1, wherein the lithium ion conductor comprises greater than 0 to 20 mole percent nitrogen, based on a total content of the lithium ion conductor.

4. The lithium ion conductor of claim 1, wherein a Li crystallographic site comprises $M^a$ disposed thereon.

5. The lithium ion conductor of claim 1, wherein $M^a$ is a monovalent element, a divalent element, a trivalent element, or a tetravalent element.

6. The lithium ion conductor of claim 4, wherein a is 1 and $M^a$ is monovalent and is at least one of H, Na, K, or Rb.

7. The lithium ion conductor of claim 4, wherein a is 2 and $M^a$ is divalent and is at least one of Be, Mg, Ca, Sr, or Ba.

8. The lithium ion conductor of claim 4, wherein a is 3, and $M^a$ is trivalent and is at least one of B, Al, Ga, In, Sc, Y, La, Ce, Pr, or Nd.

9. The lithium ion conductor of claim 4, wherein a is 4, and $M^a$ is tetravalent and is at least one of Hf, Ti, Sn, Si, Ge, or Pb.

10. The lithium ion conductor of claim 1, wherein $M^b$ is a divalent element, a trivalent element, a tetravalent element, or a pentavalent element.

11. The lithium ion conductor of claim 10, wherein b is 2 and $M^b$ is divalent and is at least one of Be, Mg, Ca, Sr, or Ba.

12. The lithium ion conductor of claim 10, wherein b is 3 and $M^b$ is trivalent and is at least one of B, Al, Ga, In, Sc, Y, La, Ce, Pr, or Nd.

13. The lithium ion conductor of claim 10, wherein b is 4 and $M^b$ is tetravalent and is at least one of Hf, Ti, Sn, Si, Ge, or Pb.

14. The lithium ion conductor of claim 10, wherein b is 5 and $M^b$ is pentavalent and is at least one of V, Ta, or Nb.

15. The lithium ion conductor of claim 1, wherein b is 6 and $M^b$ is hexavalent and is at least one of Cr, Mo, or W.

16. The lithium ion conductor of claim 1, wherein $M^a$ and $M^b$ are different.

17. The lithium ion conductor of claim 1, wherein X is at least one of F, Cl, Br, or I.

18. The lithium ion conductor of claim 1, wherein the lithium ion conductor has an ionic conductivity of $1 \times 10^{-6}$ siemens per centimeter to $1 \times 10^{-4}$ siemens per centimeter, at 25° C.

19. A component for a lithium battery comprising:
a first layer comprising a lithium ion conductor and having a porosity of 0 percent to less than 25 percent, based on a total volume of the first layer, wherein an average pore diameter of the first layer is 1 nanometer to 50 nanometers;
a second layer comprising a porous material having a porosity of 25 percent to 80 percent, based on a total volume of the second layer,
wherein the second layer is on the first layer and has a composition that is different from a composition of the first layer, and
wherein the lithium ion conductor comprises a compound of Formula 1:

$$Li_{7-a*\alpha-(b-4)*\beta-x}M^a{}_\alpha La_3 Zr_{2-\beta}M^b{}_\beta O_{12-x-\delta}X_x N_\delta \qquad \text{Formula 1}$$

wherein in Formula 1,
$M^a$ is a cationic element having a valence of a,
$M^b$ is a cationic element having a valence of b, and
X is an anion having a valence of −1,
wherein, when $M^a$ includes H, $0 \leq \alpha \leq 5$, otherwise $0 \leq \alpha \leq 0.75$, and
wherein $0 \leq \beta \leq 1.5$, $0 \leq x \leq 1.5$, $(a*\alpha+(b-4)\beta+x) > 0$, and $0 < \delta \leq 6$.

20. The component of claim 19, wherein the lithium ion conductor is in a form of a layer having a thickness of 100 nanometers to 40 micrometers.

21. A component for a lithium battery comprising:
a first layer comprising a lithium ion conductor and having a porosity of 0 percent to less than 25 percent, based on a total volume of the first layer;
a second layer comprising a porous material having a porosity of 25 percent to 80 percent, based on a total volume of the second layer, and
an ionic liquid in a pore of the second layer,
wherein the second layer is on the first layer and has a composition that is different from a composition of the first layer,
wherein the lithium ion conductor comprises a compound of Formula 1:

$$Li_{7-a*\alpha-(b-4)*\beta-x}M^a{}_\alpha La_3 Zr_{2-\beta}M^b{}_\beta O_{12-x-\delta}X_x N_\delta \qquad \text{Formula 1}$$

wherein in Formula 1,
$M^a$ is a cationic element having a valence of a,
$M^b$ is a cationic element having a valence of b, and
X is an anion having a valence of −1,
wherein, when $M^a$ includes H, $0 \leq \alpha \leq 5$, otherwise $0 \leq \alpha \leq 0.75$, and
wherein $0 \leq \beta \leq 1.5$, $0 \leq x \leq 1.5$, $(a*\alpha+(b-4)\beta+x) > 0$, and $0 < \delta \leq 6$.

22. The component of claim 21, wherein an average pore diameter of the first layer is 1 nanometer to 50 nanometers.

23. A lithium battery comprising:
a positive electrode;
a negative electrode comprising at least one of lithium or a lithium alloy; and
the component of claim 19 disposed between the positive electrode and the negative electrode.

24. A protected positive active material comprising:
a positive active material; and
a coating layer on the surface of the positive active material, wherein the coating layer comprises the lithium ion conductor of claim 1.

25. A lithium battery comprising:
a positive electrode;
a negative electrode comprising at least one of lithium or a lithium alloy; and
the component of claim 21 disposed between the positive electrode and the negative electrode.

\* \* \* \* \*